UNITED STATES PATENT OFFICE 1,941,610

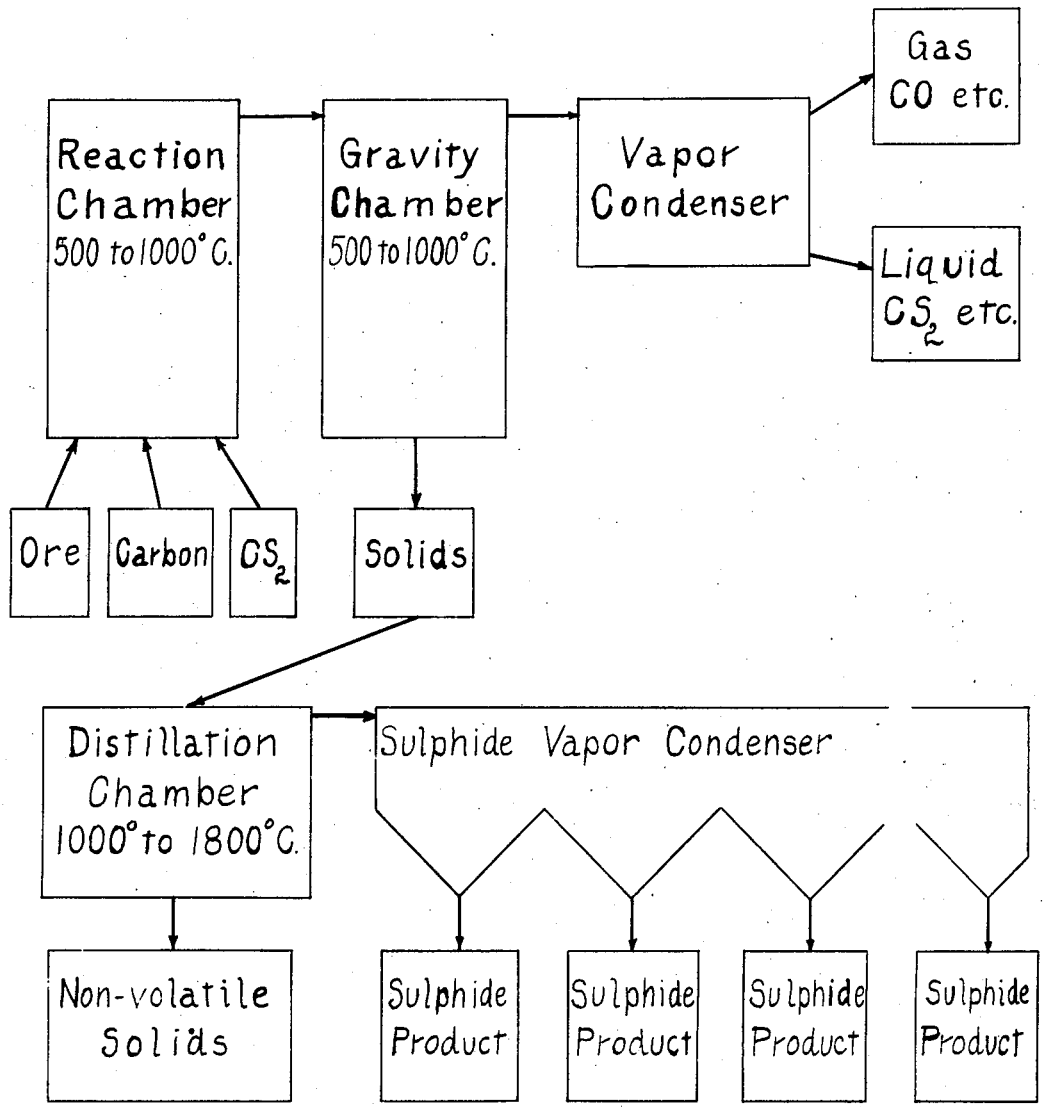

PROCESS FOR DECOMPOSING ORES

George A. Macready, Los Angeles, Calif.

Application December 15, 1931
Serial No. 581,160

6 Claims. (Cl. 23—134)

My invention relates to a process for decomposing ores by means of hot sulphur bearing vapors and the separation of the various elements composing the ore by gravity settling, vaporization and condensation of their sulphur compounds.

An object of my invention is to promote the chemical action in a turbulent mixture of ore and hot sulphur bearing vapor, such as carbon disulphide, separate the solid and vapor products by gravity, heat the solids to a higher temperature to volatilize sulphur compounds of the elements, and condense the vapors at gradually reducing temperature so that each compound is separated from the others by its condensation at the temperature locality corresponding to its condensation temperature.

My invention is particularly adaptable to the decomposition aluminum bearing and other ores to obtain the sulphide for electrolytic treatment.

This application covers improvements over the process disclosed in my application Serial Number 549,335 filed July 7, 1931 for Process for decomposing ores. The improvement lessens the volume of vapors which must be raised to the volatilization temperature of the product desired.

The raw materials required for my process are: ore, which should preferably be dried and crushed or pulverized to facilitate rapid chemical reaction: carbon, such as coke, coal or charcoal, also dried and crushed or pulverized: sulphur for carbon disulphide: fuel, preferably fuel gas or oil: and electric power for operation of auxiliary machinery and for the subsequent electrolysis of the sulphide products.

The accompanying drawing is a diagrammatic flow sheet illustrating the steps of my process.

The first step in my process is to feed ore, carbon and carbon disulphide into a hot reaction chamber. No particular form is essential for the reaction chamber except that it have inlets for the admission of the charge, preferably near the lower portion, and an outlet for discharge of products. The chamber should be lined with a refractory sulphur resisting lining such as barium sulphide lining. The temperature of the reaction chamber is maintained (by external heating) between 500 and 1000 degrees centigrade, usually about red heat but varied to suit the particular ore.

The charge of ore and carbon can be fed separately or mixed together either in pulverized form or in briquettes. An excess quantity of carbon disulphide should be supplied, preferably to the lower portion of the charge so that the flow of the vapor will agitate and churn the charge causing intimate mixture and accelerating chemical action.

In the hot sulphur bearing vapors of the reaction chamber many complex and varied chemical reactions and products occur. Some of the principal products are sulphides of the elements of the ore, carbon monoxide, unaltered portions of the original charge and others. One probable chemical reaction is probably expressed by the following equation:

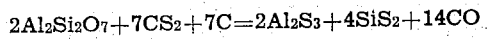

$$2Al_2Si_2O_7 + 7CS_2 + 7C = 2Al_2S_3 + 4SiS_2 + 14CO$$

It is not claimed that the chemical reactions are new because the action of carbon disulphide on alumina and silicates in the presence of carbon has been known for probably 75 years. This application is directed to the method or process for accomplishing the known reactions economically by a continuous process.

The continuous supply of materials to the reaction chamber causes the products and unaltered charge to overflow into another chamber which may be designated as the gravity chamber.

In the gravity chamber the solids settle from the vapors by gravity to the bottom where they can be drawn off and the vapors discharge from the top of the gravity chamber to a condenser.

The vapors consist principally of the excess carbon disulphide and carbon monoxide with lesser quantities of other vapors. They are conducted through the condenser passage and allowed to cool so that the carbon disulphide condenses and can be collected for use over and over again in the process. The carbon monoxide gas can be used for fuel. If the other constituents of the vapor are of sufficient quantity to be important they can be separated by using the process disclosed in my co-pending application.

The solids settled in the gravity chamber are drawn off, continuously if desired, and fed into a distillation chamber where a very high temperature is maintained. The temperature of the solids is therefore increased to above the volatilization temperature of some of the constituents. The temperature may be as high as 1800 degrees centigrade for some ores. Many sulphides volatilize at this temperature. The material which does not volatilize in the distillation chamber consists principally of carbon and undecomposed ore: It can be drawn off from the chamber and re-run or used as fuel.

The vapors from the distillation chamber consist largely of metallic sulphides of elements originally in the ore and are discharged into a sulphide vapor condenser (or sublimation chamber). The vapors are gradually cooled as they flow from the hot toward the cool end of the condenser. The compounds having the highest volatilization temperature condense near the hot end of the passage and other compounds condense farther along toward the cool end with the result that there is a separation of the different compounds and each compound is deposited at the locality corresponding to its condensation temperature.

The separation gives a variety and concentration of products derived from elements originally in the ore. Each product can be treated or disposed of to the best advantage. Silicon sulphide can be treated for recovery of sulphur for re-use in the process. This process is intended mainly for the cheap production of aluminum sulphide which can be treated by electrolysis for recovery of metallic aluminum and the sulphur re-used again in the process.

I claim as my invention:

1. A process for decomposing ores which consists of agitating a mixture of ore and carbon with hot carbon di-sulphide vapors, separating solid and vapor products by gravity, heating the settled solids to a temperature above the vaporization temperature of sulphides therein, separating the hot sulphide vapors from the nonvolatile solids, conducting the sulphide vapors through a condenser passage where their temperature is gradually reduced, and isolating sulphides of elements derived from the ore by condensation at different temperature localities of the passage.

2. A process for decomposing ores consisting of feeding ore carbon and carbon di-sulphide into a reaction chamber heated to a temperature between 500 and 1000 degrees centigrade, overflowing the charge and its products into a gravity chamber wherein the solid and vapor products of the hot mixed charge separate by gravity, recovering excess carbon di-sulphide from the vapor by condensation, subjecting the gravity settled solids to higher temperature to vaporize sulphides therein, conducting the vaporized sulphides through a condenser passage wherein the vapor temperature is decreased, and isolating sulphides of different elements derived from the ore by condensation at different temperature localities of the passage.

3. A process for decomposing ores consisting of feeding ore, carbon and carbon di-sulphide into a reaction chamber heated to a temperature between 500 and 1000 degrees centigrade, overflowing the charge and its products into a gravity chamber wherein the solid and vapor products separate by gravity, recovering excess carbon di-sulphide from the vapor by condensation, subjecting the solids to a higher temperature to vaporize and separate sulphides therefrom, and condensing each sulphide as a product by passing the sulphide vapor through a passage wherein the temperature is decreased.

4. A process for decomposing ores which consists of agitating a charge of ore and carbon by a current of hot carbon disulphide vapor to promote chemical action between said charge and said vapor and separating the resulting products by gravity and temperature control.

5. A process for decomposing ores which consists of feeding ore, carbon and carbon-disulphide into a heated reaction chamber supplying sufficient carbon-disulphide to churn and agitate the charge in said chamber into an intimate mixture and promote chemical action therein, overflowing the charge into a gravity chamber wherein vapors and solids separate by gravity, the vapors being subsequently cooled for the condensation and recovery of carbon-disulphide, heating the solids from the gravity chamber to a higher temperature to distil sulphide vapors therefrom, and condensing the sulphide vapors at several temperatures to isolate sulphides of constituents of the original ore.

6. A process for treating aluminum bearing ores which consists of agitating a mixture of ore and carbon in a reaction chamber by a current of carbon-disulphide vapor at a temperature between 500 and 1000 degrees centigrade, overflowing the charge and its products into a gravity chamber wherein solids and vapors separate by gravity, the vapors being subsequently cooled for condensation and recovery of carbon-disulphide, heating the solids from the gravity chamber to a higher temperature to distil sulphide vapors therefrom, and condensing the sulphide vapors at several temperatures to isolate aluminum sulphide therefrom.

GEORGE A. MACREADY.